Aug. 14, 1928.
E. E. EICKMEYER
LIQUID MEASURING PUMP
Filed Feb. 5, 1925
1,681,105
2 Sheets-Sheet 1
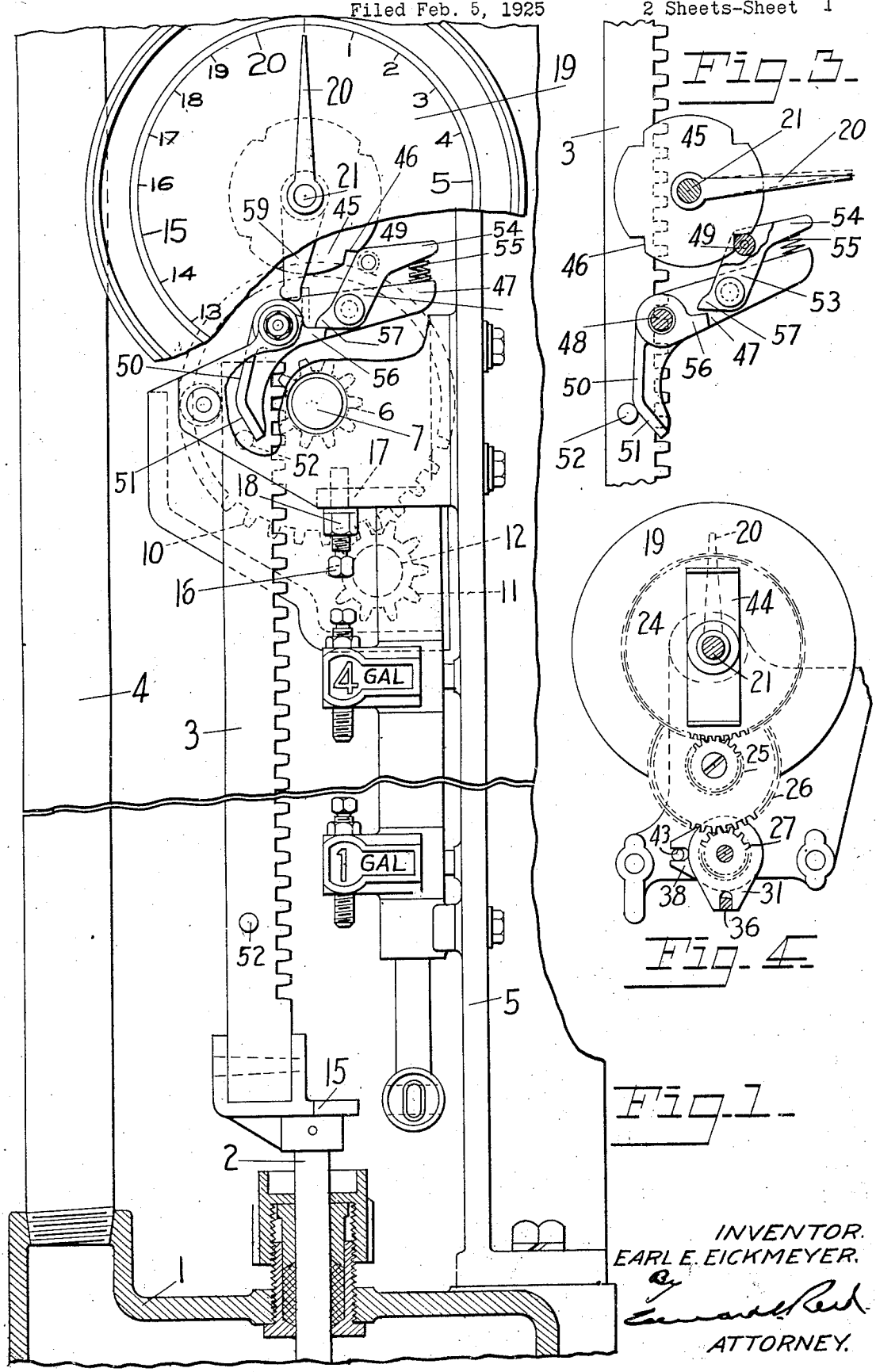
INVENTOR.
EARL E. EICKMEYER.
By
ATTORNEY.

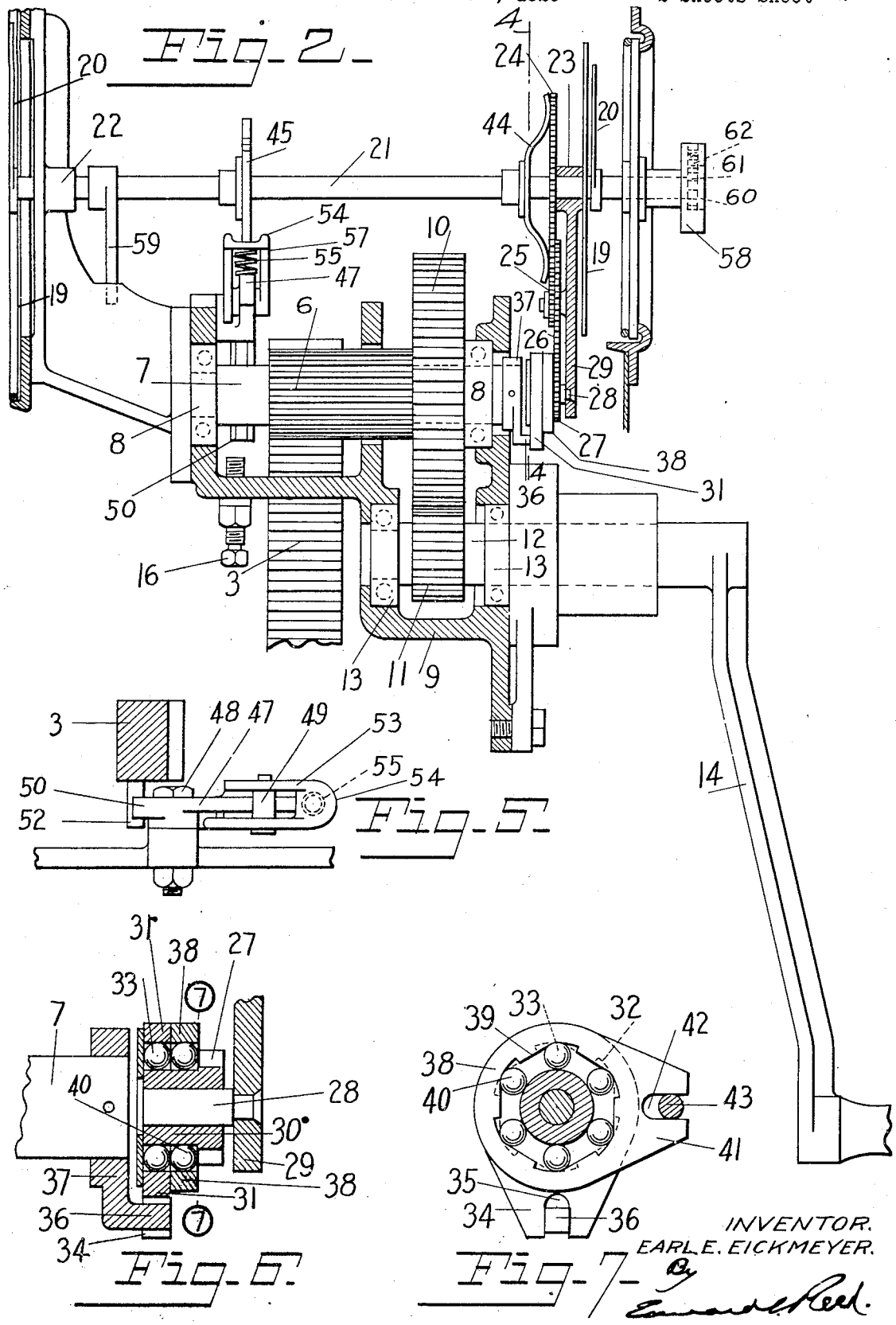

Patented Aug. 14, 1928.

1,681,105

UNITED STATES PATENT OFFICE.

EARL E. EICKMEYER, OF DAYTON, OHIO, ASSIGNOR TO THE NATIONAL RECORDING PUMP COMPANY, OF DAYTON, OHIO, A CORPORATION OF OHIO.

LIQUID-MEASURING PUMP.

Application filed February 5, 1925. Serial No. 6,977.

This invention relates to liquid measuring pumps and is designed more particularly for use with gasoline dispensing pumps, such as are commonly employed at filling stations for automobiles.

Pumps of this character usually employ a cylinder and reciprocatory piston as the measuring element, suitable actuating mechanism being connected with the piston to impart movement thereto. This actuating mechanism is in turn connected with a registering device which may consist either of a visual indicator or recording mechanism, or both, and this registering device is advanced a distance corresponding to the amount of liquid delivered from the measuring cylinder. The length of stroke which it is necessary to impart to the piston in order to deliver a certain specified quantity of liquid will sometimes vary according to varying conditions of installation, as, for example, the distance of the pump from the supply tank. In order that the pump may accurately measure the liquid discharged, means are provided for regulating the amount of movement which can be imparted to the piston, this regulating means being usually in the form of an adjustable stop which positively limits the movement of the piston. Variations in the movement of the piston naturally cause similar variations in the movement imparted to the actuating mechanism and inasmuch as the register or indicating device is operated by the actuating mechanism the movement of the register will also vary. Consequently it sometimes happens that by regulating the stroke of the piston to cause a certain quantity of liquid to be discharged, say five gallons, the relation between the piston and the operating mechanism will be so changed that the register will not indicate the exact amount of liquid discharged but will indicate an amount either slightly in excess of or slightly less than the amount delivered. In the case of a single operation of the pump, to deliver five gallons of liquid, this discrepancy would be very slight and would be scarcely noticeable on the visual indicator but where there are repeated operations of the pump to deliver a relatively large quantity of liquid, say twenty gallons, the discrepancy becomes greater on each operation of the pump and at the end of the delivery there will be a substantial discrepancy between the amount of liquid actually delivered and the amount shown by the register or indicator. In some instances this discrepancy may be as much as a quart or even two quarts. If payment is made according to the register it will be obvious that the customer pays either too much or too little for the liquid which he has received.

One object of the present invention is to provide means for correcting the reading of the register, or indicator, at the end of each operation of the pump so that it will correspond to the amount of liquid actually delivered.

A further object of the invention is to provide such means which will be automatically controlled by the actuating mechanism for the pump.

A further object of the invention is to provide such a device which will be simple in its construction and positive in its operation and which will not interfere in any way with the normal operation of the pump or the registering device.

Other objects of the invention will appear as the device is described in detail.

In the accompanying drawings Fig. 1 is a front elevation, partly broken away, of a portion of a dispensing pump embodying my invention, a portion of the cylinder being shown in section; Fig. 2 is an elevation of the pump operating mechanism and registering devices, showing the invention applied thereto, with the frame members in section; Fig. 3 is a detail view of the device for correcting the reading of the register; Fig. 4 is a front elevation of the driving gearing from the register; Fig. 5 is a plan view of the actuating device for effecting the correction in the register reading; Fig. 6 is a sectional view of the clutch connection between the pump actuating mechanism and the register actuating mechanism; and Fig. 7 is a sectional view taken on the line 7—7 of Fig. 6.

In these drawings I have illustrated one embodiment of my invention and have shown the same as applied to a gasoline dispensing pump of a well known type but it will be understood that this particular embodiment has been chosen for the purposes of illustration only and that the device may take various forms and may be applied to measuring pumps of various kinds without departing from the spirit of the invention.

The dispensing pump here shown comprises a cylinder 1 having mounted therein a piston, which is not shown, but which is provided with a piston rod 2 extending through the upper end of the cylinder and having connected therewith and in effect forming a part thereof, a toothed bar or rack 3 which forms a part of the actuating mechanism for the piston. A discharge pipe 4 is connected with the upper end of the cylinder 1 and leads to the point of discharge. Mounted on the cylinder 1 is an upwardly extending frame or supporting structure 5 on which the various parts of the operating and registering mechanism are mounted. The operating mechanism further consists of a pinion 6 which meshes with the rack 3 and is carried by a shaft 7 which is journaled in bearings 8 mounted in a bracket or supplemental frame structure 9 which in turn is supported by the frame or standard 5. Rigidly connected with the pinion 6 is a gear 10 which meshes with a gear 11 on a shaft 12 which is journaled in bearings 13 also mounted in the bracket 9 and which is connected an operating handle 14. The operation of the handle 14 will act through the gear train to impart longitudinal movement to the rack bar 3 and thus cause the piston to discharge a measured quantity of liquid from the cylinder. The movement of the piston may be regulated to cause the delivery of accurately measured quantities of liquid and, as here shown, an adjustable stop is provided. The present pump is a five gallon pump and in order that measured quantities less than five gallons may be delivered I have provided a series of stops, all of which, with the exception of the last or five gallon stop, are movably mounted so that they may be moved into and out of operative relation to the piston. As here shown, the casting by means of which the piston rod is connected with the rack 3 is provided with a shoulder 15 and the stops are movable into and out of the path of that shoulder. Inasmuch as none of these stops, excepting the five gallon stop, is concerned with the present invention they need not be described but it will be noted that the five gallon stop comprises a screw 16 which is adjustably mounted in a fixed bracket 17 and is secured in its adjusted position by means of a lock nut 18. Thus by adjusting the screw with relation to the bracket 17 the amount of movement imparted to the piston by the operating mechanism may be varied.

Any suitable registering mechanism may be provided for registering the amount of liquid delivered and usually such a pump is provided with a visual indicator which can be read both by the customer and by the operator. In the present machine, this indicator comprises a fixed dial 19 and a pointer or indicating member 20 which is movable over that dial to indicate thereon the quantity of liquid delivered. This pointer or indicating member is rigidly secured to a shaft 21 which is journaled in bearings 22 and 23 in fixed parts of the frame structure and is operatively connected with the actuating mechanism for the pump, this connection being such that the movement of the pointer will correspond to the movement of the piston and when a full movement has been imparted to the piston the indicator should indicate five gallons. Mounted on the shaft 21 and connected therewith is a gear 24 which meshes with a pinion 25 which in turn is rigidly connected with a gear 26 which meshes with a pinion 27 on a short shaft 28 which is rigidly mounted in a fixed member 29 forming part of the supporting frame. This pinion 27 is connected with the shaft 7 of the pump operating mechanism and in order that the registering device may be held against reverse movement and the pump operating mechanism in part moved in a reverse direction to lower the piston I have interposed a suitable clutch connection between the pinion 27 and the shaft 7. This connection consists of a hub or sleeve 30 formed integral with the pinion 27 and rotatably mounted on the shaft 28. Rotatably mounted on this hub is a clutch member 31 having in its inner periphery a series of tapered recesses 32 in which are mounted clutch balls 33. This clutch member is provided with a depending portion or lug 34 having a slot 35 to receive a lug 36 which is carried by a collar 37 rigidly secured to the shaft 7. The arrangement of the tapered recesses in the clutch member is such that when the shaft 7 rotates in a forward direction the balls will establish a driving connection between the clutch member and the sleeve 30 and will thus actuate the pinion 27 and the operating mechanism for the indicator or registering device. When the shaft 7 rotates in the opposite direction the clutch balls will release the clutch member 31 from the hub 30 so that the shaft 7 may rotate in a reverse direction without interfering with the register or its operating mechanism. Also rotatably mounted on the sleeve or hub 30 of the pinion 27 is a second clutch member 38 having tapered recesses 39 to receive clutch balls 40. This clutch member is provided with a lateral extension 41 having a slot 42 to receive a stud or pin 43 mounted on a fixed part of the supporting frame and which serves to hold the clutch member 38 against rotation. The tapered recesses of the clutch member 38 are so arranged that any reverse movement of the pinion 27 will cause the clutch balls to connect the hub 30 with the clutch member 38 and thus lock the pinion against rotation in a reverse direction.

It will be obvious that the connection between the pump actuating mechanism and the registering device is such that the registering device will be moved a distance directly proportional to the movement of the actuating mechanism and if this mechanism makes a greater or a smaller movement, because of the regulation of the movement of the piston, the pointer 20 will move a greater or a lesser distance and consequently will not, at the end of that movement, register accurately with the indication corresponding to the number of gallons of liquid delivered. To correct this discrepancy I have provided means controlled by the operating mechanism for the pump which will move the pointer 20, or other movable part of the registering device, with relation to the register operating mechanism and will cause the pointer to be accurately alined with the indication corresponding to the amount of liquid delivered. To accomplish this, means are provided for rotating the shaft 21 with relation to its driving mechanism and consequently the connection between the shaft 21 and the driving mechanism must be such as to permit of this movement of the shaft 21. This I prefer to accomplish by interposing a friction clutch between the actuating gearing for the register and the shaft 21. As here shown, I have rigidly secured to the shaft 21 a resilient clutch member or spring 44 which bears against the adjacent face of the gear 24, which is loosely mounted on the shaft 21. The frictional contact between the clutch member 44 and the face of the gear is sufficient to drive the registering device but will permit the shaft to rotate relatively to the gear, the latter being held against rotation by the clutch mechanism above described. Rigidly secured to the shaft 21 is a disk 45 having in its periphery a series of recesses the walls of which diverge outwardly. In the present instance, the visual indicator has a capacity of twenty gallons and the pump is provided with a five gallon cylinder and I have therefore provided the disk 45 with four recesses, which are shown at 46, as spaced at equal distances about the periphery of the disk. Cooperating with the recessed disk is an alining device having a part adapted to enter one of the notches or recesses in the periphery of the disk and to shift the disk, and the shaft 21, to bring the pointer into alinement or accurately registering position. In the present construction an arm 47 is pivotally mounted on a stud 48 mounted on part of the frame structure 9 and carries an alining member 49, which is preferably in the form of a roller and which is so arranged on the arm 47 that when the pointer 20 of the indicator is in approximately registering position with the five gallon indication, or any multiple of the five gallon indication, this alining member will enter the wide outer end of one of the recesses 46 and will act on one of the inclined walls of the recess to move the disk into proper alinement with the alining member, that is, into a position in which the alining member will be centrally located in the recess, and this movement of the disk will move the pointer forwardly or rearwardly as the case may be to bring it into line with the correct indication on the dial. The arm 47 is actuated by the operating mechanism for the pump and, in the present construction, a second arm 50 is rigidly secured to the arm 47 and has an inclined lower end, as shown at 51, arranged in the path of a stud 52 carried by the rack 3 and so arranged that it will engage the inclined face of the arm 50 as this rack approaches the upper limit of its movement and will cause the arm 47 to be so actuated that the alining member 49 will enter one of the recesses in the disk 45 just as the rack completes its upward movement. It is desirable that the alining member 49 should be yieldable or cushioned to prevent injury to the parts should an excessive movement be imparted to the arm 47. As here shown, the alining member is connected with the arm 47 by means of a movable carrier or yoke 53 which comprises a pair of arms straddling the arm 47 and pivotally mounted thereon, the alining member or roller 49 being mounted between these arms and in the plane of the disk 45. The yoke 53 has an outward extension 54 between which and the arm 47 is confined a spring 55 which tends to move the member 49 away from the arm 47. This movement is limited by a lug 56 rigidly secured to the arm 47 and arranged in the path of a toe 57 carried by one arm of the yoke 53. The spring 55 is of sufficient stiffness to cause the alining member to actuate the disk 45 but will yield before the pressure is sufficiently great to injure the parts. It will be apparent therefore that at the end of each complete operation of the pump the pointer or movable member of the register will be adjusted to cause the same to indicate the amount of liquid actually delivered by the piston and that, in the present device, this adjustment will take place upon the delivery of each five gallons of liquid, and that in this manner all discrepancies between the indication on the register and the amount of liquid actually delivered are avoided.

The registering device is reset to zero at the end of each delivery of liquid and to this end the shaft 21 has connected therewith an operating knob 58 by means of which it may be rotated in a reverse direction, and an arm 59 rigidly secured to the shaft is arranged to engage a part of the supporting frame, which constitutes a fixed stop, and positively check the movement of the shaft when the registering shaft is in its zero position. To prevent the fraudulent manipulation of the pointer to cause the same to indicate a greater quantity of liquid than has been delivered the connection between the knob 58 and the shaft is established by means of a one-way clutch which will permit the shaft to be rotated by the knob only in a reverse direction. As here shown, the knob 58 is rotatably mounted on a hub 60 having at its outer end ratchet teeth 61 with which engage a spring pressed pawl 62 carried by the knob, the teeth being so arranged that when the knob is turned in a forward direction the pawl will ride over the teeth without effecting the pointer.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. The combination with a measuring pump, an actuating device therefor, and a registering device comprising a movable member controlled by said actuating device, of means operated by said actuating device at the end of each complete movement thereof to correct any variation between the position of said movable member and the quantity of liquid delivered by said pump.

2. The combination with a measuring pump, an actuating device therefor, and a registering device comprising a rotatable part controlled by said actuating device, of an alining device comprising a member mounted in fixed relation to and rotating with the rotatable part of said register, and a member adapted to engage the first mentioned member and correct the position of said rotatable part of said register, and means controlled by said actuating device to impart operative movement to the last mentioned member at the end of each complete movement of said actuating device.

3. The combination with a measuring pump, an actuating device therefor, and a register comprising a rotatable member controlled by said actuating device, of a part connected with and rotatable with said rotatable member and having alining recesses, an alining member arranged to enter one of said recesses and adjust the rotatable member of said register, and means controlled by said actuating device for imparting operative movement to said member.

4. The combination with a measuring pump, an actuating device therefor, and a register comprising a rotatable member controlled by said actuating device, of a part connected with and rotatable with said rotatable member and having alining recesses, a pivoted arm, means controlled by said actuating device for imparting movement to said arm, and a part carried by said arm and arranged to enter one of said alining recesses when movement is imparted to said arm.

5. The combination with a measuring pump, an actuating device therefor, and a register comprising a rotatable member controlled by said actuating device, of a part connected with and rotatable with said rotatable member and having alining recesses, a pivoted arm, means controlled by said actuating device for imparting movement to said arm, a part carried by said arm and arranged to enter one of said alining recesses when movement is imparted to said arm, and a yieldable connection between said part and said arm.

6. The combination with a measuring pump, an actuating device therefor, and a register comprising a rotatable member controlled by said actuating device, of a part connected with an rotatable with said rotatable member and having alining recesses, a pivoted arm, means controlled by said actuating device for imparting movement to said arm, a supporting structure pivotally mounted on said arm, an alining device carried by said supporting structure, spaced from said arm, and arranged to enter one of said alining recesses when movement is imparted to said arm, and a spring acting on said supporting structure to hold said alining device normally in spaced relation to said arm.

7. The combination with a measuring pump, an actuating device therefor, a registering device comprising a shaft and a member rotated by said shaft, and a yieldable connection between said shaft and said actuating device, of means controlled by said actuating device for imparting rotatory movement to said shaft relatively to said actuating device at the end of each complete movement of said actuating device.

8. The combination with a measuring pump, an actuating device therefor, a registering device comprising a shaft and a member rotated by said shaft, and a yieldable connection between said shaft and said actuating device, of a disk rigidly secured to said shaft and having alining recesses in the periphery thereof, an alining member mounted for movement into and out of one of said alining recesses to impart movement to said shaft relatively to said actuating device, and means controlled by said actuating device for imparting movement to said alining device.

9. The combination with a measuring pump, an actuating device therefor, a registering device comprising a shaft and a member rotatable with said shaft, and an operative connection between said shaft and said actuating device comprising a friction clutch, of a disk rigidly secured to said shaft and having a plurality of alining recesses, a rock arm mounted adjacent to said disk, an alining member carried by said rock arm for movement into one of said alining recesses to shift said disk and said rotatable member relatively to said actuating device, and means controlled by said actuating device to impart movement to said rock arm.

10. The combination with a measuring pump, a reciprocatory bar for actuating said pump, driving mechanism connected with said bar, a registering device comprising a rotatable member, a shaft connected with said rotatable member, and a driving connection between said shaft and said actuating mechanism, said connection comprising cooperating friction members to permit said shaft to rotate relatively to said driving mechanism, of a member secured to said shaft and having alining recesses, a rock arm mounted on a fixed axis, an alining member carried by said rock arm and arranged to enter one of said alining recesses in said disk to move said shaft relatively to said driving mechanism, and means actuated by said reciprocatory bar for imparting movement to said rock arm.

11. The combination with a measuring pump, a reciprocatory bar for actuating said pump, driving mechanism connected with said bar, a registering device comprising a rotatable member, a shaft connected with said rotatable member, and a driving connection between said shaft and said actuating mechanism, said connection comprising cooperating friction members to permit said shaft to rotate relatively to said driving mechanism, of a member secured to said shaft and having alining recesses, a rock arm pivotally mounted on a fixed axis, an arm connected with said rock arm for actuating the same, a part carried by said reciprocatory bar for actuating the last mentioned arm, and an alining member carried by said rock arm and arranged to be moved thereby into one of said alining recesses.

12. The combination with a measuring pump, a reciprocatory bar for actuating said pump, driving mechanism connected with said bar, a registering device comprising a rotatable member, a shaft connected with said rotatable member, and a driving connection between said shaft and said actuating mechanism, said connection comprising cooperating friction members to permit said shaft to rotate relatively to said driving mechanism, of a member secured to said shaft and having alining recesses, a rock arm pivotally mounted on a fixed axis, an arm connected with said rock arm for actuating the same, a part carried by said reciprocatory bar for actuating the last mentioned arm, an alining member carried by said rock arm and arranged to be moved thereby into one of said alining recesses, and a yieldable connection between said alining member and said rock arm.

13. The combination with a measuring pump, a reciprocatory bar for actuating said pump, driving mechanism connected with said bar, a registering device comprising a rotatable member, a shaft connected with said rotatable member, and a driving connection between said shaft and said actuating mechanism, said connection comprising cooperating friction members to permit said shaft to rotate relatively to said driving mechanism, of a member secured to said shaft and having alining recesses, a rock arm pivotally mounted on a fixed axis, an arm connected with said rock arm for actuating the same, a part carried by said reciprocatory bar for actuating the last mentioned arm, a yoke pivotally mounted on rock arm, an alining member carried by said yoke and arranged to enter one of said alining recesses when operative movement is imparted to said rock arm, a spring acting on said yoke to support said alining member normally in spaced relation to said arm, and cooperating parts carried by said yoke and said rock arm to limit the movement of said yoke by said spring.

In testimony whereof, I affix my signature hereto.

EARL E. EICKMEYER.